United States Patent [19]
Morgenstern, deceased et al.

[11] 3,857,631

[45] Dec. 31, 1974

[54] ELECTRIC ADJUSTING MEANS FOR AZIMUTH AND ELEVATION ADJUSTMENT

[75] Inventors: David M. Morgenstern, deceased, late of Shaker Heights, Ohio; by Stanley Morgenstern, Shaker Heights; Harold M. Chatmann, Cleveland; Allan R. Cole, Cleveland, all of Ohio executors

[73] Assignee: Tenna Corporation, Cleveland, Ohio

[22] Filed: Sept. 30, 1971

[21] Appl. No.: 185,250

[52] U.S. Cl. .................. 350/289, 74/501 M, 350/7
[51] Int. Cl. ............................................. G02b 5/08
[58] Field of Search.......... 74/501 M; 350/289, 6, 7, 350/304, 307

[56] References Cited
UNITED STATES PATENTS

| | | | |
|---|---|---|---|
| 1,799,740 | 4/1931 | Felton................................. | 74/801 |
| 3,008,375 | 11/1961 | Henderson.......................... | 350/289 |
| 3,027,807 | 4/1962 | Barcus et al. ....................... | 350/289 |
| 3,064,536 | 11/1962 | Weingartner....................... | 350/289 |
| 3,164,915 | 1/1965 | Benner et al. ..................... | 74/801 X |
| 3,453,906 | 7/1969 | Ito........................................ | 74/801 |

*Primary Examiner*—Ronald L. Wibert
*Assistant Examiner*—Michael J. Tokar
*Attorney, Agent, or Firm*—Baldwin, Egan, Walling & Fetzer

[57] ABSTRACT

An adjusting means for azimuth and elevation adjustment comprising a hollow support and a universal joint connected to the support and to the part to be adjusted. A reversible electric motor is mounted in the support having a shaft, a reduction gear and an electro-magnetically controlled coupling. Planetary transmission means are provided and means whereby the shaft may optionally be coupled with each of said transmission means by a reduction gear and an electro-magnetically controlled coupling. The transmission means are capable of acting on the universal joint to bring about a rotation around two different axes.

6 Claims, 26 Drawing Figures

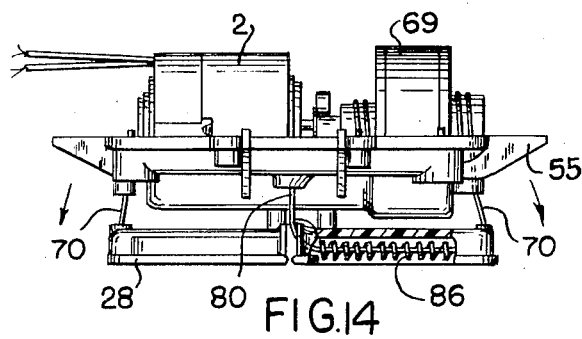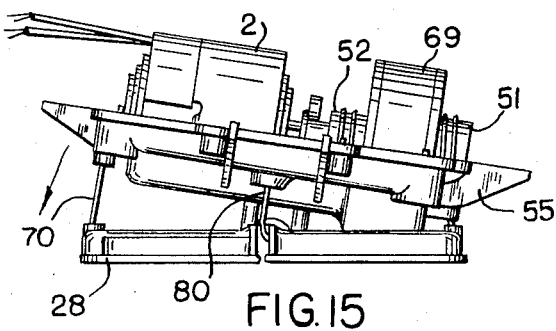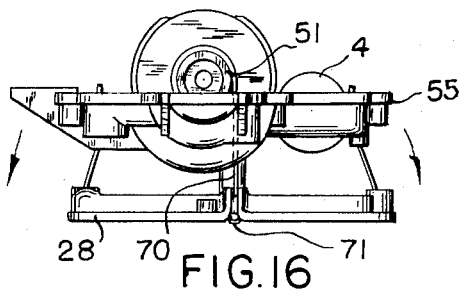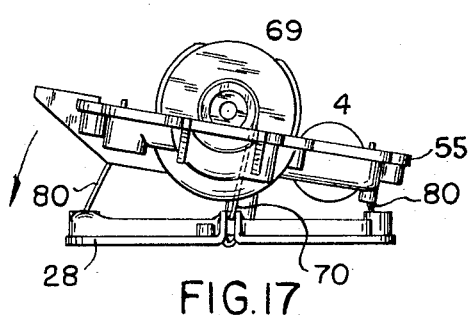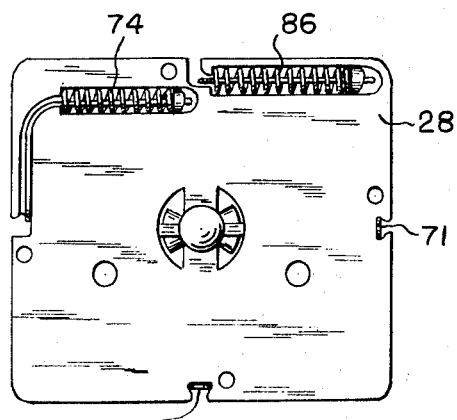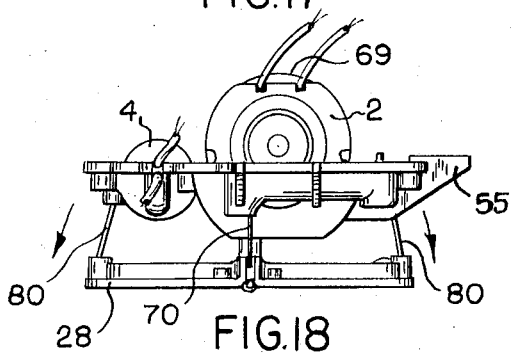

ELECTRIC ADJUSTING MEANS FOR AZIMUTH AND ELEVATION ADJUSTMENT

This application contains subject matter disclaimed in U.S. Pat. No. 3,552,836 issued Jan. 5, 1971, entitled Electric Adjusting Means for Azimuth and Elevation Adjustment, portions of the subject matter of such patent being incorporated herein and made a part hereof.

This invention relates to an electric adjusting means for azimuth and elevation adjustment.

The adjusting means of the invention is more specially designed for a rear view mirror to be mounted on a motor vehicle, said mirror being adapted to be adjusted to any desired position from the driver's seat. Said adjusting means, however, can also used for the remote adjustment of a mirror for other purposes, directional lamp, aerial or other source of radiation, or for a directing means.

Motor car mirrors are known, the position of which may be mechanically adjusted on a vertical and a horizontal axis by means of a cable which at one end is provided with hand operated driving means, whereas the other end is connected to parts located in the mirror support and being capable of translating the movements of the cable into the desired rotation of the mirror around two mutually perpendicular axes.

The disadvantage of mirrors of this kind is that, when the mirror is mounted on a fender, the cable connection on the inside of the fender often requires much space and is easily soiled, whereas the length of the cable has to be adapted to the dimensions of the vehicle. In practice it has been found that this leads to difficulties and considerable installing expenses.

An object of the invention is to provide an adjustment means wherein all mechanical parts are located in the fixed supporting parts of the mirror or the like, whereas the connection with the remote controlling parts is formed by an electric cable with three or four leads. Installing such a mirror is as simple as with an ordinary one.

The adjusting means of the invention is characterized by a hollow mounting support connected to the part to be adjusted through a universal joint, by a reversible electric motor mounted on said support, the shaft of which may be optionally coupled with one of two transmission parts by means of a reduction gear and an electro-magnetically controlled coupling, said transmission parts being capable of acting on the joint so as to bring about a rotation around two different axes such as either around an axis coaxial with or parallel to the axis of the support, or around an axis substantially perpendicular to former axis.

In particular this coupling may be designed as a clutch cam which, without relative rotation, is slidable in longitudinal direction of the motor shaft and adapted to be alternately put into engagement with two coaxial pinions for coupling the latter to the shaft, said pinions driving the universal joint by means of considerably reductive planetary transmissions, the electromagnet being coaxially positioned with respect to the motor and acting on an armature cooperating with the cam and resiliently urged into one of its coupling positions, which magnet may bring said armature into its other coupling position.

Preferably both planetary transmissions are coaxially arranged in two planes perpendicular to the motor axis.

Both pinions act as the sun wheel of the corresponding planetary transmission, engage one part of a number of double stepped planet wheels disposed around the circumference of the sun wheel, the number of teeth in both parts of the planet wheels being slightly different.

Each of both these parts of the planet wheels is in engagement with a toothed rim, so that in driving the pinion the planet wheels are rolled off around one rim whereas the other is driven at a very slow speed with respect to the first one. For the azimuth drive one rim of one planetary transmission is fixedly connected to the mounting support, whereas the other is connected to a casing which may rotate the universal joint around the axis of the support.

This casing is provided with a second toothed rim which forms part of the second planetary transmission, the second toothed rim of which is rotatable with respect to this casing and is provided with a dog or pin which may describe a circular orbit around the axis of the support, which dog or pin engages with a guide in the universal joint, said guide extending in a plane through the axis of rotation which is substantially perpendicular to the axis of the support, and according to which axis the universal joint is coupled with the casing.

This universal joint may comprise a dome shaped hood to which the element to be adjusted may be fixed parallel to the aforesaid axis of rotation, which hood at least partially surrounds the planetary transmission and the casing.

In the case of a rear view mirror, this mirror may be connected to the universal joint by means of a friction coupling in order to protect this joint and the transmission parts against impact loads.

A further object is to provide an adjusting means wherein the universal joint comprises a coupling part which is rotatable around a fixed axis and is provided with a fork which is in engagement with a cam, said cam being adapted to be driven by one of the transmission parts, the element to be adjusted being pivotally connected to said coupling part around an axis perpendicular to the fixed axis, and being coupled to the other transmission part by means of a connecting rod, which is connected to said element in a point beyond said pivoting axis.

More specifically, the cam is connected to the first toothed rim and the connecting bar is coupled with the pin of the second toothed rim.

It is also possible to make both planetary transmissions symmetrically with respect to a plane perpendicular to their common axis, said transmissions driving the cam and a drive shaft connected to the connecting rod respectively.

Moreover it is preferred that the fixed axis and the pivoting axis intersect each other substantially in one point.

In the case of a rear view mirror for a motor vehicle with a hood encompassing said mirror, the plane through the outer rim of the hood is disposed at a small distance before the point of intersection of the axes.

In a preferred embodiment each of said transmission means comprises a pulley, a first and a second string being laid loosely in a loop around said first and second pulley respectively, the extremities of said strings each being fixed in two opposite points of said mirror, the line connecting the fixing points of said first claim being perpendicular to the line connecting the fixing points of the said second string, and guiding means for guiding said strings from said pulleys towards the respective fixing points of said mirror.

A further object of the invention is to provide strings attached to the mirror by spring means for providing a tensioning force in the strings. The springs are mounted in tubular parts at the rear side of the mirror.

A further object of the invention is to provide compression springs seated against the shoulder portions of the tubular parts with the strings each extending through a corresponding spring.

Finally the invention provides an electric switch for an adjustment means according to the invention, which switch is designed in such a manner, that by moving elements thereof by means of the fingertips in two mutually perpendicular directions corresponding adjustments of the part to be adjusted may be effected.

The invention will be explained in detail by reference to the drawings, in which.

Figure 3:
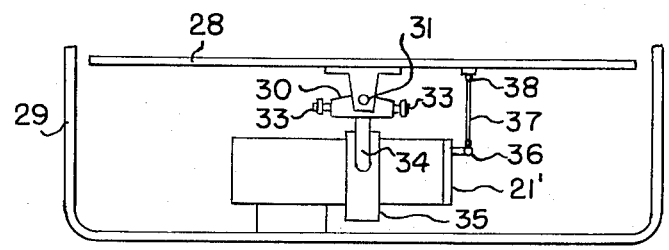
FIG. 3 is a cross-section of a motor-car mirror in a fixed hood with drive means adapted thereto.
Figure 6:
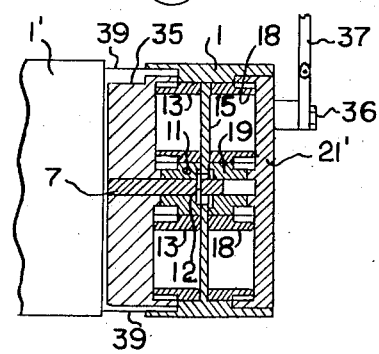
FIG. 6 is a preferred embodiment of the adjusting means for the mirror of FIG. 3.
Figure 8:
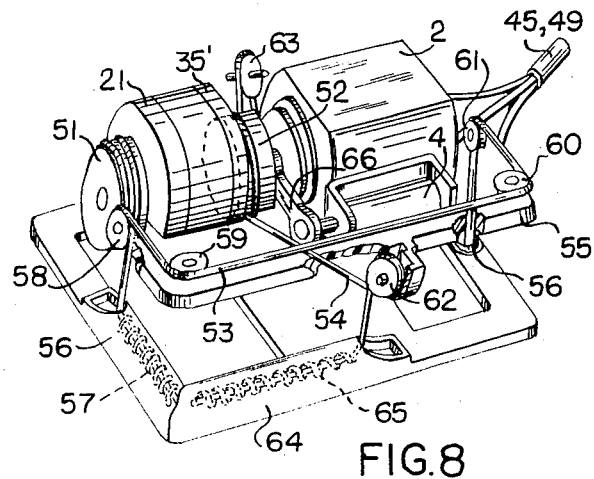
Figure 9:
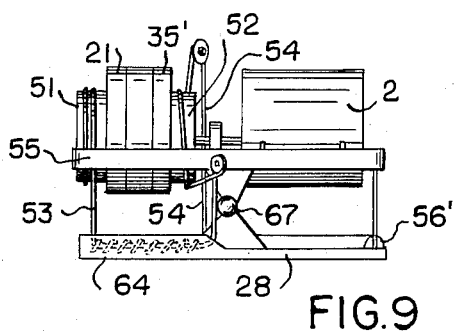
Figure 10:
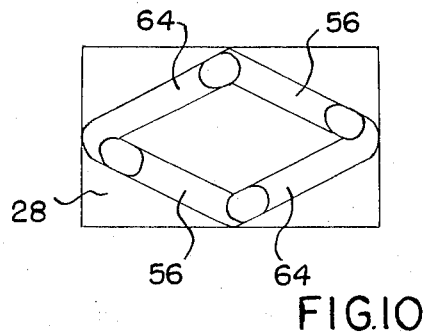

FIGS. 8 and 9 are a perspective view and a side view respectively of a modified embodiment of the assembly according to FIGS. 3 and 6; and FIG. 10 is a rear view of a modification of the mirror according to FIGS. 8 and 9.

Figure 11:
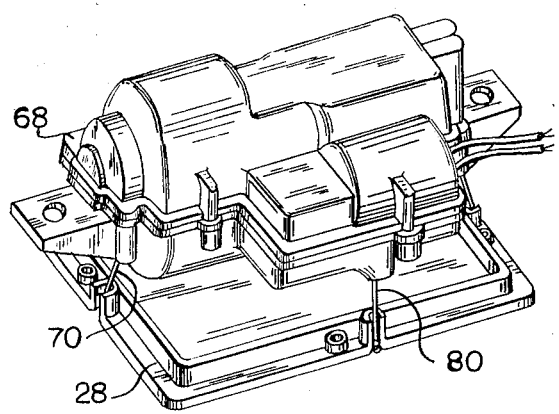
Figure 12:
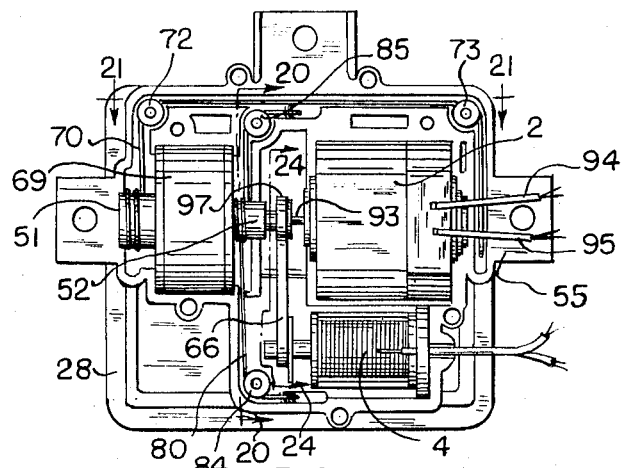
Figure 13:
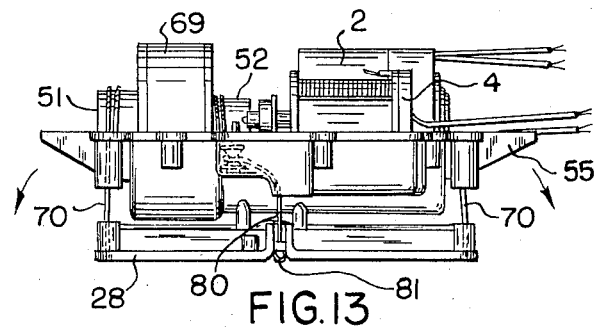
Figure 20:
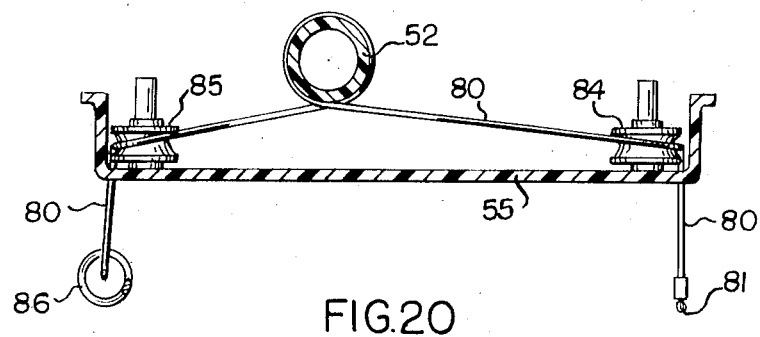
Figure 21:
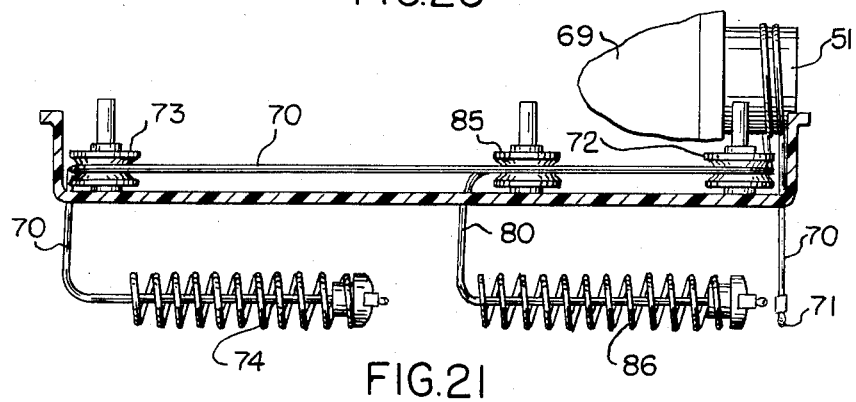
Figure 22:
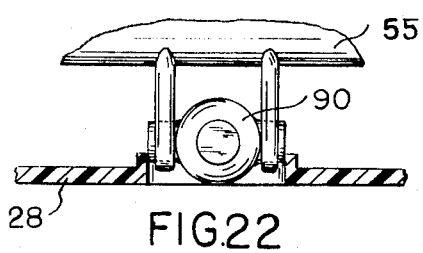
Figure 23:
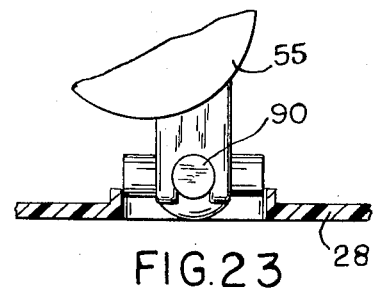

FIG. 11 is a perspective view of a modification of the device shown in FIG. 8, but with the cover on;

FIG. 12 is a top plan view of the device shown in FIG. 11 with the cover removed;

FIG. 13 is a front elevational view of the device shown in FIG. 12;

FIG. 14 is a rear view of the device shown in FIG. 12, with portions broken away to show the interior thereof;

FIG. 15 is a view similar to FIG. 14, but showing the mirror base plate tilted with respect to the motor support;

FIG. 16 is a left end view of the device shown in FIG. 12;

FIG. 17 is a view similar to FIG. 16, but showing the mirror base plate tilted with respect to the motor support;

FIG. 18 is a right end view of the device shown in FIG. 12;

FIG. 19 is a bottom view of the device shown in FIG. 12;

FIG. 20 is a view taken along the line 20—20 of FIG. 12;

FIG. 21 is a view taken along the line 21—21 of FIG. 12;

FIG. 22 is a front elevational view of the universal joint connecting the mirror base plate and the motor support;

FIG. 23 is a left end view of the universal joint shown in FIG. 22; and

Figure 24:
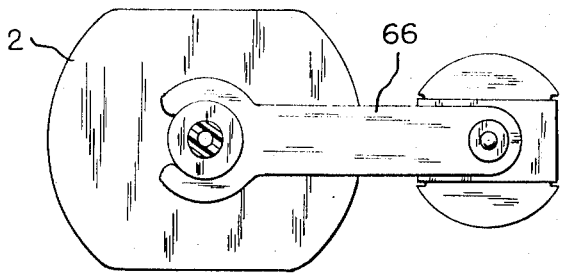

FIG. 24 is a view taken along the line 24—24 of FIG. 12.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

Figure 1:
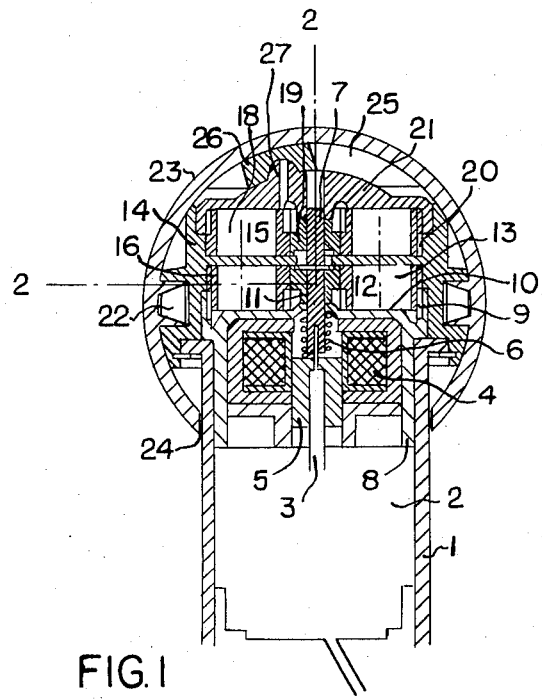
FIG. 1 shows an axial section through an adjusting means according to the invention.
Figure 2:
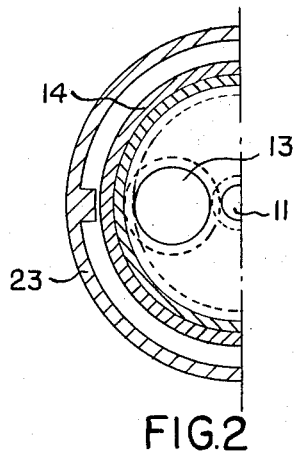
FIG. 2 is a section along the line 2-2 of FIG. 1.

The embodiment shown in FIG. 1 comprises a fixed support 1, which may be vertically positioned. Inside this support an electric motor 2 is disposed, the shaft 3 of which is coaxial with the support 1. On top of the motor 2 a magnet coil 4 is provided, inside which an armature 5 is slidable around the shaft 3, which armature is urged downwardly by a spring 6, and is connected to an output shaft 7, the latter being slidable in axial direction, but being non-rotatably coupled with the shaft 3.

A first casing 8 is arranged around the magnet coil 4, which casing is connected to the support 1. This casing is provided with an inner toothed rim 9 and a bottom wall 10. A first sun wheel 11, disposed above this bottom wall, is freely rotating on the shaft 7, but is coupled to this shaft by a dog or catch 12 as the armature 5 is in its lowest position.

Surrounding this sun wheel 11 at least two planet wheels 13 rest upon the bottom 10, said wheels being provided with two superposed sets of teeth with slightly different numbers of teeth. The lowermost set of teeth is in engagement with the toothed rim 9, whereas one of both, and generally the upper one, is in engagement with the sun wheel 11.

On top of the casing 8 a second casing 14 is mounted, which surrounds the first one and is rotatable with respect to it. The interior of this second casing is difided into two portions by a partition 15. This partition is supported upon the sun wheel 11 and the planet wheels 13. Below the partition 15 said casing is provided with a toothed rim 16 which is in engagement with the upper set of teeth of the planet wheels 13. Now, as the sun wheel 11 is driven, the planet wheels roll off along the toothed rim 9. Since the teeth engaging the rim 16 have a slightly different number of teeth, the rim 16, in consequence thereof, will be rotated with respect to the casing 14 at a speed and in a sense depending on the difference in the number of teeth. As a matter of fact the number of teeth and the diameter of the toothed rims 9 and 16 will correspondingly differ.

Over the bottom 15 the casing 14 is provided with an interior toothed rim 17, which is in engagement with double planet wheels 18 corresponding with the planet wheels 13. The planet wheels 18 engage with a second sun wheel 19, which bears on the partition 15 and is coupled with the shaft 7 as soon as the magnet coil 4 is energized. The second set of teeth of the planet wheels 18 engages with a toothed rim 20 of a disc 21 which rotatably fits into the casing 14, so that, in driving the sun wheel 19, said disc 21 is slowly rotated with respect to the casing 14.

The casing 14 is provided with two journals 22 the axis of which intersects the output shaft 7 perpendicularly. Surrounding these journals a spheroidal hollow hood 23 is rotatable, this hood being provided with a recess 24 through the support 1 extends inwardly. This hood surrounds the casing 14 and all other interior parts.

On its upper side the hood 23 is provided with a traverse guide 25 extending parallel to the axis of the journals 22. In this guide a sliding block 26 is located into which a rounded dog or catch pawl 27 on the upper surface of the disc 21, and disposed beyond its center, is fitted.

As the disc 21 rotates, the dog or catch pawl 27 describes a circular path. As a result of the connection of the hood with the journals 22, this cap cannot rotate, but may, however, be tilted around the journals for following this movement of the catch or dog 27. In this manner an elevation adjustment of an element connected with the hood 23 may be obtained, the angular extension of which depends on the location of the dog or pawl 27 and of the guide 25. As the casing 14 is rotated, the hood 23 is rotated too, so that an azimuth adjustment is obtained.

With motor-car mirrors there is always the risk of passersby hitting the mirror and disturbing its adjustment. Since the gear ratio obtained with planetary transmission can amount to 3,000:1 or more, and the internal friction may be rather large, this transmission is self-braking when the mirror is subjected to an impact. It may be useful, however, to connect the mirror to the cap 23 by means of a frictional connection in order to protect the transmission against impacts. This may also be obtained by using a casing 14 comprising two coaxial parts which are coupled by friction to one another.

Figure 1A:
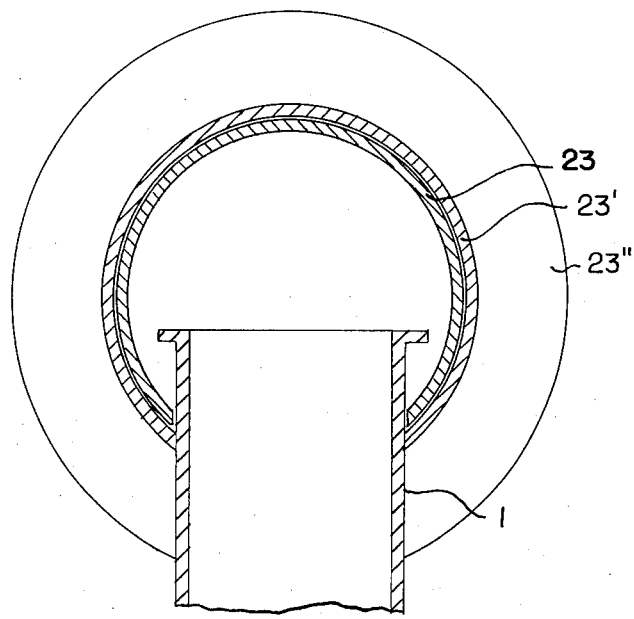
FIGS. 1a and 1b are partial illustrations of modifications, which omit the internal drive gearing, while emphasizing the modification portions.
Figure 1B:
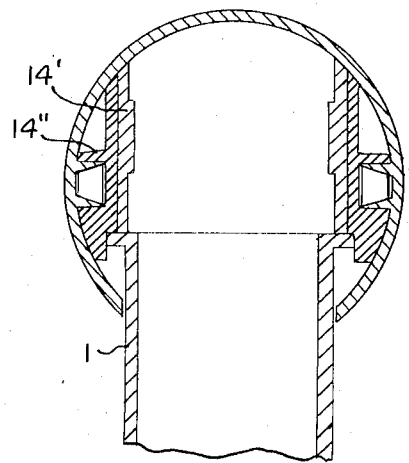

FIGS. 1a and 1b show such types of friction couplings. In FIG. 1a the hood 23 of FIG. 1 is surrounded by a second relatively movable spherical hood 23' to which the mirror or other part 23" to be adjusted is connected. While a slight daylight clearance is shown between the parts 23 and 23', it is understood that this is a drawing exaggeration and that the normal friction between those hoods is sufficient for coupling the outer hood to the inner one, but, in case of impacts, the outer hood may arbitrarily rotate around the inner one. According to FIG. 1b the casing 14 of FIG. 1 is divided into two parts 14' and 14" with a friction contact allowing a mutual coaxial relative rotation under impact loads.

Figure 4:
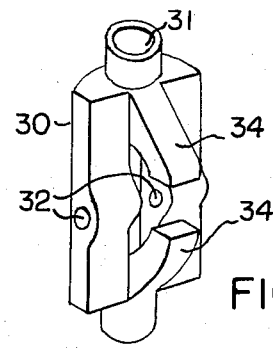
FIG. 4 is a coupling element for such a mirror.

In order to avoid this, the mirror 28 is hingedly connected to a coupling element 30 by means of rotation pins 31, shown in FIG. 4. Furthermore, this coupling is provided with mutually aligned apertures 32, the axes of which are perpendicular to the axis of the pins 31. Pins supported in bearings 33 extend into these apertures 32, said bearings being fixedly connected to the hood 29.

Figure 5:
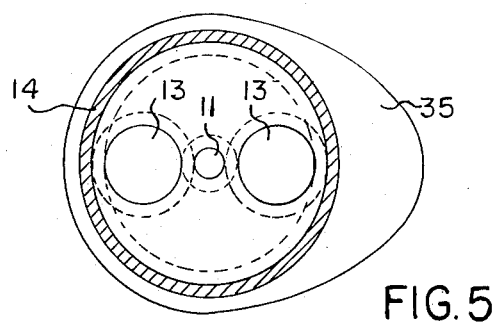
FIG. 5 is a cross-section corresponding to FIG. 2 of the adjusting means for the mirror of FIG. 3.

Furthermore the coupling element 30 possesses two protrusions 34 forming a fork lying in a plane through the pins 31 and perpendicularly to the axis of the apertures 32. The fork coacts with a cam 35, which, as shown in FIG. 5, is fixed to the second casing 14 of the driving assembly shown in FIG. 1, which assembly then no longer comprises the outer hood 23. The disc 21' of this assembly is modified in that the catch 27 has been replaced by a crank pin 36 to which a coupling rod 37 is connected, which on the other hand, is hingedly fixed at 38 to the mirror 28.

In rotating the cam 35, the fork 34 follows around the axis of rotation 33, so that the mirror 28 rotates around the same axis. As the disc 21' is rotated, the crank pin 36 drives the rod 37 so that the mirror is rotated around the axis of the pins 31. Preferably these mutually perpendicular axes of rotation intersect each other, their point of intersection being positioned only slightly behind the plane through the outer rims of the hood 29, so that the rotating mirror will not contact this hood.

FIG. 6 shows a preferred embodiment of the planetary gear system which is fully symmetrical, so that this system may be manufactured in a simpler way. This system is enclosed in a fixed casing 1' which, at the location of the cam 35, is provided with one or more apertures 39, into which the ends of the fork 34 fit. This gear system has, essentially the same structure as the system of FIG. 1, and its elements have been indicated by the same reference numbers. Therefore it is not necessary to give a detailed description of this system.

All casings and gears can be moulded from a plastic material. The supports 1 and 1' and the hoods 23 or 29 may be made from metal and/or plastic material. In a view of the large gear ratio, a very weak motor may be used, which preferably should be reversible by changing the polarity of the feeding lines. For the clutch control an additioned connection having one or two leads is sufficient.

Figure 7:
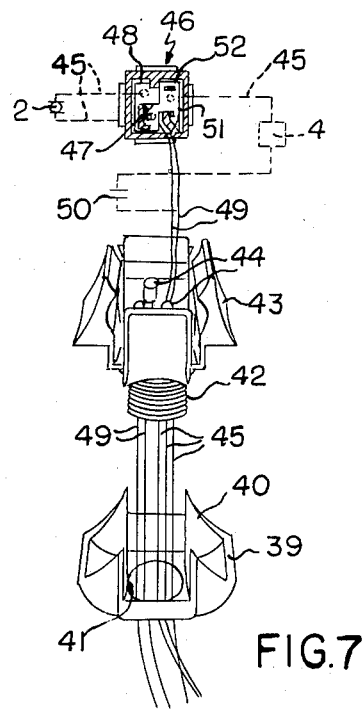
FIG. 7 is an exploded view of a switch for controlling the drive means of a mirror according to the invention, in which the electrical connections are schematically shown.

FIG. 7 shows a switch specially designed for a mirror according to the invention. This switch comprises a bottom part 39 with four extensions 40 and a central hole 41. In this hole fits a threaded stud 42 with a central bore, which stud may be fixed in a suitable location of the instrument panel of a car by means of a nut. Four lugs 43 are resiliently connected with said stud 42, which stud and lugs preferably form a unit made from a suitable plastic. In this unit three contact pins 44 are embedded, which are each connected to a separate lead 45.

In the space between the lugs 43 and the extensions 40 (the latter fitting between these lugs) a cap 46 is resiliently clamped, which cap is provided with two contact strips 47 and 48, each being connected to another lead 49. In FIG. 7 the position of the pins 44 in respect of these strips is indicated with phantom lines.

By gripping two opposed lugs 43 between two fingers, the cap 46 may be moved in two perpendicular directions. The leads 49 are connected to a source of direct current 50, and the motor 2 and the magnet coil 4 are connected to the pins 44 as indicated by dash lines.

When moving the cap 46 upward or downward as seen in FIG. 7, the motor 2 may be connected to the battery leads 49 in either one of the polarities thereof by contacting the corresponding pins 44 with either one of the strips 47 and 48, in order to energize this motor in the corresponding sense. The third pin 44 is, then, insulated from the contact strips 47 and 48 insulating strips 41 and 52. When moving the cap to the left or right, the same motor connections will be made, but, at the same time, the magnet 4 will be energized by contacting the third pin 44 with the strip 47. In this manner the mirror may be adjusted in two perpendicular directions and in the proper sense by movements of the finger tips which adequately correspond with the desired adjustment.

The adjusting means described has the advantage that all parts of it may be positioned in a small space. Especially the operative portions of the sun wheels 11 and 19 are adjacent to the partition 15, so that the stroke of the coupling cam 12 may be short. Although a simple reducing transmission is also possible wherein the change-over takes place at the slow rotating side, the specified change-over at the fast side should be preferred, since, then, the coupling cam 12 can engage very quickly.

FIGS. 8, 9 and 10 show a preferred embodiment of the complete mirror assembly comprising the planetary gear system of FIG. 6, but using means for driving the mirror differing from those according to FIGS. 3 and 6.

In FIG. 8 the motor 2 is coupled to a double planetary gear according to FIG. 6, having a first end disc 21 and a second end disc 35', the latter corresponding to the cam 35 of FIG. 6. Both ends are provided with a pulley 51 and 52 respectively, around which strings 53 and 54 respectively are laid in a double loop, which strings are not fixed to said pulleys.

Motor 2 and support 1 of the planetary gear, as well as the magnet coil 4, which is in this case a separate unit, are mounted in a frame 55.

String 53 is, at one side, directed perpendicularly to said frame 55 and through an opening of a tubular rim part of the mirror 28, in which part said string is fixed by means of a helical spring 57 as indicated in phantom lines.

At the other side string 53 is guided towards the opposite side of said frame by means of guiding rolls 58, 59, 60 and 61 rotatably mounted on frame 55, and then directed towards the mirror, at which side the end of said frame is fixed to the mirror in a corresponding tubular rim part 56' as indicated in FIG. 9.

String 54 is directed at both sides towards the mirror by means of guiding rolls 62 and 63 rotatably mounted on frame 55, and is fixed at both ends in tubular rim parts, only one of which is indicated at 64, by means of springs, one of which is shown in phantom lines at 65.

The armature of magnet coil 4 is coupled by means of a fork 66 to the motor shaft 7, in order to engage the coupling dog with one of the sun wheels 11 or 19 as desired.

The mirror is coupled to frame 55 by means of a ball joint 67 or the like, so that a universal movement of said mirror is possible.

In operation, one of the discs 21 or 35' is driven by the motor 2, dependent on whether the magnet coil 4 is energized or not. When disc 21 is rotated in one sense, string 53, which is kept tensioned by the spring 57, is accordingly wound up at one side and wound off at the other side as a result of the friction with the pulley 51, so that the mirror will be tilted in a corresponding sense around an axis perpendicular to the motor axis.

When, on the other hand, disc 35' is rotated, string 54 will be wound up at one side and wound off at the other side, so that the mirror is tilted around an axis parallel to the motor axis.

As soon as the end of the allowed stroke of the mirror is reached, the pulleys 51 or 52, as the case may be, may rotate freely because of the friction with said strings, and the strings loops will slip along the surface of the respective pulleys. This is an important improvement in respect of the system of FIGS. 3 and 6, in which, when the disc 21 or the cam 35 have rotated over half a revolution, the movement of the mirror is reversed, so that the given position of the switch according to FIG. 7 is no longer adequately related to the sense of movement. In the embodiment of FIGS. 8 and 9, however, no reversal of the movement can take place without reversing the sense of rotation of the motor 2. Another advantage is that the mechanism will not be damaged when the mirror is moved by hand or is subjected to other external forces, since, then, the strings will also slip along the pulleys.

FIG. 10 shows a plan view of the rear side of the mirror according to FIGS. 8 and 9, but with a different arrangement of the tubular parts 56 and 64, which, now, are symmetrically arranged in the form of a lozenge.

The springs 57 and 65 are preferably compressing springs, as shown, seated near the opening of the corresponding tubular part, and each string is fixed at the free end of the corresponding spring, so that no hooks or other attaching means are needed, which simplifies the mounting of said springs in the tubular parts. It is also possible to attach one end of each string directly to the mirror, since in many cases one spring is sufficient for tensioning each string.

The device shown in FIGS. 11–24 is similar to the device shown in FIGS. 8 and 9, but with some modifications such as, for example, the routing or path of the tensioned strings throughout the structure, now to be described.

In FIGS. 8 and 9, and in FIGS. 11–24, like parts are identified with like numbers.

In FIG. 11–24 there is shown the aforedescribed electric motor 2, and the solenoid 4, together with the reversible transmission 69, all having a cover 68.

Also in FIGS. 11–24, one tensioned string 70 (FIG. 16) is secured at one end to the mirror base plate 28 at the point 71 thence follows a path up through the frame or plate 55 and around the transmission pulley 51, thence around the corner pulley 72 (FIG. 12), thence around the corner pulley 73, thence down through the plate 55, and is secured to the coil spring 74 (FIG. 19) in the mirror base plate 28 to keep such string under tension.

The other tensioned string 80 (FIG. 12) is secured at one end to the mirror base plate 28 at the point 81 (FIG. 13), thence follows a path up through the frame or plate 55, thence around the corner pulley 84 (FIG. 12), thence around the transmission pulley 52, thence around the corner pulley 85, thence down through the plate 55, and is secured to the coil spring 86.

Thus, the invention provides an adjusting device for effecting limited universal adjustment of a part 28 to be adjusted including a first supporting member 55, a second supporting member 28 spaced from the first member, universal joint means 90 connecting the members effecting limited universal movement therebetween, and actuating means including the motor 2, the transmission 69, the solenoid 14, and all associated parts disposed on the first member 55 including tensioned elongated flexible connecting means 70, 80 coacting with said second member 28 to effect universal movement of such second member with respect to the first member. The second supporting member in the preferred form is an automobile fender rear view mirror supporting plate 28.

The flexible connecting means includes a first tensioned string 70 operatively connected to the second member 28 to control azimuth adjustment thereof, and a second tensioned string 80 operatively connected to the second member 28 to control elevation adjustment thereof.

The actuating means includes a reversible drive means in the form of the motor 2, means 4, 66 for reversing the drive means such as an electric motor reversing switch, a transmission 69 operatively connected to the drive means 2, said transmission having first and second rotatable output drives 51, 52, and gear shift means 4, 66, for shifting the transmission to either the first or the second output drive, the first tensioned string 70 being connected to the first output drive 51, and the seocnd tensioned string 80 being connected to the second output drive 52, whereby selection of the first output drive 51 controls azimuth adjustment of the second member 28 in one direction and reversal of the drive means 2 with such first output drive 51 selection controls azimuth adjustment of the second member 28 in an opposite direction; and whereby selection of the second output drive 52 controls elevation adjustment of the second member 28 in one direction and reversal of the drive means 2 with such second output drive 52 selection controls elevation adjustment of the second member 28 in an opposing direction.

The reversible drive means is a direct current electric motor 2 having a shaft 93. Means for actuating the motor is a suitable source of electric current attached to the motor leads 94, 95. An electric reversing switch (not shown in FIGS. 11–24) is connected to the motor for reversing the same.

The gear shift means includes a solenoid 4, and said transmission includes a coupling dog 66 operatively connected with the transmission for selecting either the first or said second output drives 51, 52. A connecting fork 97 operatively connects the solenoid to the coupling dog, whereby selective actuation of the solenoid selectively actuates the dog.

The transmission 69 includes two planetary transmission means each having a sun pinion wheel and planet wheels meshing with said sun wheel, the sun wheels of the planetary transmission means being disposed coaxially with said motor axis. An electromagnetically controlled coupling is provided whereby the shaft may optionally be coupled with one of the two pinion sun wheels by the electro-magnetically controlled coupling, the transmission means being capable of acting on said universal joint to bring about a rotation around two different axes. The coupling includes the clutch dog 60 slidable in longitudinal direction of the motor shaft 93 without relative rotation and adapted to be alternately put into engagement with the sun pinions, all as aforedescribed in the FIG. 8 structure.

In the preferred form, the second member is a rectangular planar plate 28 with the ends of the first tensioned string 70 being operatively connected to the ends of the plate, and the ends of the second tensioned string 80 being connected to the sides of the plate. Resilient means are disposed between and connected to at least one end of each of said strings and the plate, said resilient means including the compressed coiled springs 74 and 86. The output drives include rotatable drive pulleys 51, 52 and the respective strings 70, 80, are operatively wound around said pulleys. The outer surface of said pulleys in contact with the strings have a predetermined coefficient of friction enabling the strings to slip on the pulleys when the strings are subjected to a maximum preselected tension occurring when an azimuth or elevation adjustment limit of the second member 28 is reached.

Thus, the invention provides remote control adjustment of an automobile fender mounted rear view mirror, for example. Such adjustment provides complete azimuth and elevation adjustments or any combination thereof.

It will be obvious that the invention can be applied in all such cases where an adjustment means with remote control and of very restricted dimensions is required, e.g., in directing means, optical instruments, observation or control apparatus for radioactive spaces and the like.

What is claimed is:

1. An adjusting means for azimuth and elevation adjustment of a mirror to be adjusted comprising a hollow support, a universal joint connected to said support and to the mirror to be adjusted, one single reversible electric motor mounted in said support having a shaft, two planetary transmission means each having a sun pinion wheel and planet wheels meshing with said sun wheel, the sun wheels of said planetary transmission means being disposed coaxially with said motor axis, an electromagnetically controlled coupling whereby said shaft may optionally be coupled with one of said two pinion sun wheels by said electromagnetically controlled coupling, said transmission means being capable of acting on said universal joint to bring about a rotation around two different axes, each one of said transmission means comprising a pulley, a first and a second string being laid loosely in a loop around said first and second pulley respectively, the extremities of said strings each being fixed in two opposite points of said mirror to be adjusted, the line connecting the fixing points of said first string being substantially perpendicular to the line connecting the fixing points of the said second string, and guiding means for guiding said strings from said pulleys towards the respective fixing points of said mirror.

2. An adjusting means according to claim 1, wherein the strings are attached to said mirror to be adjusted by spring means providing tensioning force in said strings.

3. An adjusting means according to claim 2, wherein said springs are mounted in tubular parts to the rear side of said mirror to be adjusted.

4. An adjusting means, according to claim 3, wherein said springs are compression springs seated against shoulder portions of said tubular parts, said strings each extending through a corresponding spring and being attached to the free end thereof.

5. An adjusting means according to claim 4, further comprising wall means defining a hood having one open side, which hood is adapted to non-engagingly enclose the mirror to be adjusted and also affixed to said hollow support, a plane through the outer rim of said walls defining said hood being disposed at a small distance before said universal joint between the hood and the mirror, so that the mirror to be adjusted will not strike said hood during its adjustment.

6. An adjusting means according to claim 1, wherein said planetary transmissions are symmetrical with respect to a plane perpendicular to their common axis.

* * * * *